United States Patent
Li

(10) Patent No.: US 11,055,927 B2
(45) Date of Patent: Jul. 6, 2021

(54) METHOD FOR BUILDING SCENE, ELECTRONIC DEVICE AND STORAGE MEDIUM

(71) Applicant: Beijing Dajia Internet Information Technology Co, Ltd., Beijing (CN)

(72) Inventor: Kun Li, Beijing (CN)

(73) Assignee: BEIJING DAJIA INTERNET INFORMATION TECH CO., LTD., Beijing (CN)

( * ) Notice: Subject to any disclaimer, the term of this patent is extended or adjusted under 35 U.S.C. 154(b) by 0 days.

(21) Appl. No.: 16/926,477

(22) Filed: Jul. 10, 2020

(65) Prior Publication Data

US 2021/0012570 A1 Jan. 14, 2021

(30) Foreign Application Priority Data

Jul. 12, 2019 (CN) .......................... 201910631024.X

(51) Int. Cl.
- G06T 19/00 (2011.01)
- G06F 3/01 (2006.01)
- G06T 15/20 (2011.01)
- H04N 21/8545 (2011.01)

(52) U.S. Cl.
CPC ............ *G06T 19/006* (2013.01); *G06F 3/011* (2013.01); *G06T 15/205* (2013.01); *H04N 21/8545* (2013.01)

(58) Field of Classification Search
CPC ..... G06T 19/006; G06T 15/205; G06T 19/00; G06T 15/20; G06F 3/011; G06F 3/01; H04N 21/8545; G11B 27/034
See application file for complete search history.

(56) References Cited

U.S. PATENT DOCUMENTS

| | | | |
|---|---|---|---|
| 2009/0195538 A1* | 8/2009 | Ryu | G06T 19/006 345/419 |
| 2017/0213388 A1* | 7/2017 | Margolis | G06T 19/006 |
| 2019/0259205 A1* | 8/2019 | Nissinen | G06T 19/006 |
| 2020/0111267 A1* | 4/2020 | Stauber | G06K 9/00671 |

* cited by examiner

*Primary Examiner* — Xilin Guo
(74) *Attorney, Agent, or Firm* — Knobbe Martens Olson & Bear LLP

(57) ABSTRACT

A method for building a scene comprising: acquiring a first sequence which includes image difference values of video frames captured in a first time period; acquiring a second sequence which includes posture data of an AR device captured in a second time period; acquiring a plurality of third sequences; determining a target time difference, which includes a time difference corresponding to a third sequence with a maximum similarity to the first sequence; and acquiring video frames and posture data for building a scene according to the target time difference, thereby building an AR scene.

17 Claims, 4 Drawing Sheets

METHOD FOR BUILDING SCENE, ELECTRONIC DEVICE AND STORAGE MEDIUM

CROSS-REFERENCE TO RELATED APPLICATIONS

This application claims priority of Chinese patent application No. 201910631024.X, filed on Jul. 12, 2019, in the China National Intellectual Property Administration, the contents of which are herein incorporated by reference in their entireties.

TECHNICAL FIELD

The present disclosure relates to the technical field of image processing, and in particular, relates to a method for building a scene, an electronic device, and a storage medium.

BACKGROUND

Augmented reality (AR) devices are capable of capturing videos of real-world scenes in real time and capturing their own posture data in real time, and then superposing virtual objects and video frames in the above videos based on the above posture data to build AR scenes.

SUMMARY

The present disclosure provides a method for building a scene, an electronic device, and a storage medium. The technical solutions of the present disclosure are as follows.

According to one aspect of embodiments of the present disclosure, method for building a scene is provided. The method includes:

acquiring a first sequence, wherein the first sequence includes image difference values of video frames captured in a first time period;

acquiring a second sequence, wherein the second sequence includes posture data of the AR device captured in a second time period, wherein the first time period and the second time period include time periods prior to a current time, and a duration of the second time period is not less than a duration of the first time period;

acquiring a plurality of third sequences, wherein each third sequence includes a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

determining a target time difference, wherein the target time difference includes a time difference corresponding to the third sequence with a maximum similarity to the first sequence; and acquiring video frames and posture data for building a scene according to the target time difference, and building an AR scene using the acquired video frames and posture data.

According to another aspect of embodiments of the present disclosure, an electronic device is provided. The electronic device includes:

a processor;

a memory, configured to store instructions executable by the processor, wherein the processor is configured to execute the instructions to perform the following steps:

acquiring a first sequence, wherein the first sequence includes image difference values of video frames captured in a first time period;

acquiring a second sequence, wherein the second sequence includes posture data of the AR device captured in a second time period, wherein the first time period and the second time period include time periods prior to a current time, and a duration of the second time period is not less than a duration of the first time period;

acquiring a plurality of third sequences, wherein each third sequence includes a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

determining a target time difference, wherein the target time difference includes a time difference corresponding to the third sequence with a maximum similarity to the first sequence; and acquiring video frames and posture data for building a scene according to the target time difference, and building an AR scene using the acquired video frames and posture data.

According to a further aspect of embodiments of the present disclosure, a storage medium storing instructions therein is provided. When the instructions stored in the storage medium are executed by a processor of an electronic device, the electronic device may be enabled to perform the following steps:

acquiring a first sequence, wherein the first sequence includes image difference values of video frames captured in a first time period;

acquiring a second sequence, wherein the second sequence includes posture data of the AR device captured in a second time period, wherein the first time period and the second time period include time periods prior to a current time, and a duration of the second time period is not less than a duration of the first time period;

acquiring a plurality of third sequences, wherein each third sequence includes a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

determining a target time difference, wherein the target time difference includes a time difference corresponding to the third sequence with a maximum similarity to the first sequence; and acquiring video frames and posture data for building a scene according to the target time difference, and building an AR scene using the acquired video frames and posture data.

BRIEF DESCRIPTION OF DRAWINGS

The accompanying drawings herein are incorporated into and constitute a part of the specification, showing embodiments consistent with the present disclosure and explaining the principles of the present disclosure together with the specification. The drawings are not intended to improperly limit the present disclosure.

DESCRIPTION OF EMBODIMENTS

For a better understanding of persons of ordinary skill in the art on the technical solutions of the present disclosure, the technical solutions according to the embodiments of the present disclosure are clearly and completely described hereinafter with reference to the accompanying drawings.

It should be noted that the terms "first", "second" and the like in the specification and claims of the present disclosure and the above brief description of drawings are for the purpose of distinguishing similar objects, instead of necessarily describing a specific sequence or a successive order. It should be understood that the data used in such a way are interchangeable where appropriate, such that the embodiments of the present disclosure described herein can be implemented in a sequence other than those illustrated or described herein. The implementations set forth in the following description of exemplary embodiments do not represent all implementations consistent with the present disclosure. Instead, they are merely examples of apparatuses and methods consistent with the aspects related to the disclosure as recited in the appended claims.

Figure 1:
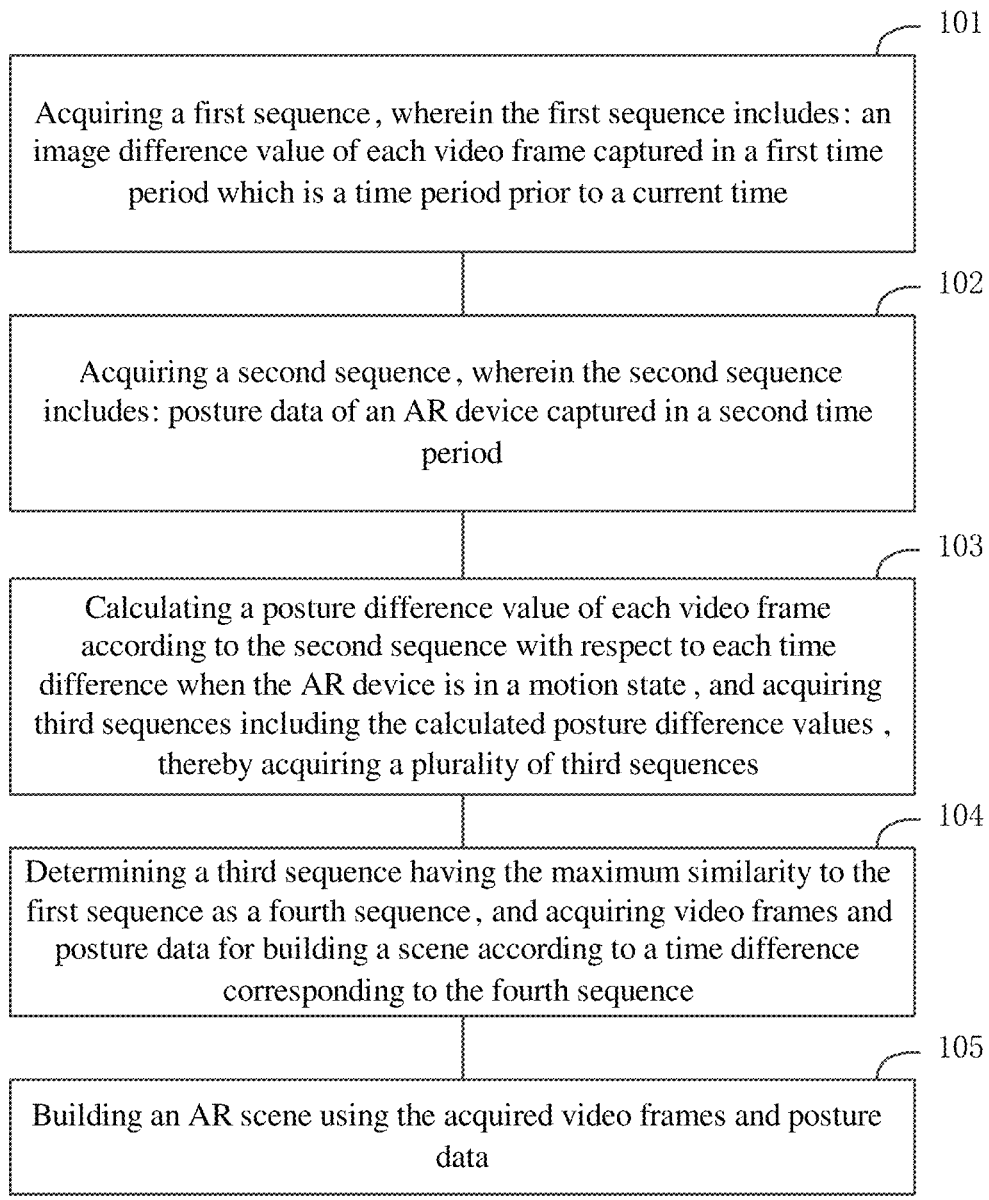
FIG. 1 is a flowchart showing a method for building a scene according to an embodiment of the present disclosure.

FIG. 1 is a flowchart showing a method for building a scene according to an embodiment of the present disclosure. As shown in FIG. 1, the method is applicable to an AR device. The AR technology is a technology to build a scene combining virtuality and reality by adding corresponding virtual objects such as images, videos, and three-dimensional virtual models according to the locations and angles of shot images. An AR device refers to a device having AR functions. In some embodiments, the AR device includes a mobile phone with an AR client installed, a tablet computer with an AR client installed, or an AR wearable device, or the like. The AR wearable device includes an AR eye, an AR helmet, an AR mask, or the like. The above method includes the following steps 101 to 105.

In step 101, a first sequence is acquired.

The first sequence includes: an image difference value of each video frame captured in a first time period. The image difference value of each video frame embodies a posture change of the AR device. The first time period includes a time period prior to a current time.

In some embodiments, the image difference value of each video frame includes an image difference between the video frame and a previous video frame of the video frame. The previous video frame of the video frame includes a previous video frame adjacent to the video frame.

In some embodiments, the AR device includes an image capturing unit. For example, the image capturing unit includes a camera. Based on this, the above video frame is captured by an image capturing unit such as a camera of the AR device.

Since the captured video frames are captured by the image capturing unit of the AR device, and may embody scenes within a shooting range of the image capturing unit of the AR device, the image difference values of each video frame may embody an image difference between the video frame and a previous video of the video frame, such that a difference in the shooting range of the image capturing unit may be characterized. Further, since the difference in the shooting range is resulted from the change in the posture of the AR device, the image difference value of the video frame may embody the change in the posture of the AR device.

In some embodiments, the AR device also stores a capture time of each video frame. For example, if the capture time of each video frame is also stored in the first sequence, the first sequence includes not only the image difference value of the video frame, but also the capture time of the video frame. For example, the first sequence includes the image difference values of a plurality of captured video frames and the capture times of the plurality of video frames, and the image difference values of the plurality of video frames are arranged in a time sequence according to the capture times.

In some embodiments, the above AR device captures the video frames based on a fixed period, that is, a video frame is captured in each fixed period, so as to capture a plurality of consecutive video frames. Then, the durations of the capture times of any two adjacent video frames are equal.

In some embodiments, the first time period is a time period that lasts prior to the current time by a first predefined duration, and the first predefined duration is predefined according to an application scene. For example, the first predefined duration above is 5 s, 10 s, 20 s, or the like, which is not limited in the present disclosure. In other embodiments, the first predefined duration above may not be set, and the duration of the first time period is changeable. For example, when the first sequence is acquired under different circumstances, the duration of the first time period used is equal or unequal.

In some embodiments, the image difference value of each video frame is an average modulus length of an optical flow between the video frame and a previous video frame of the video frame.

The longer the average modulus length of the optical flow between any two adjacent video frames, the greater the change in the characterized posture of the AR device. In turn, the shorter the average modulus length of the optical flow between any two adjacent video frames, the smaller the change in the characterized posture of the AR device. In an AR scene, the optical flow between two adjacent video frames may also be used in other steps than in the present case. Therefore, it is sufficient to acquire the optical flow between every two adjacent video frames in the entire AR scene only once, and the acquired optical flow is shared among the respective steps. Hence, by applying the solutions according to the embodiments of the present disclosure, the image difference values can be acquired, and processing capacity is saved and the processing efficiency is improved. The acquired optical flow between every two adjacent video frames may be selected as a sparse optical flow.

In some embodiments, the above first sequence includes a first queue, wherein the first queue is configured to store the image difference values of the captured video frames. Then, the AR device captures the video frames, acquires the image difference values of the video frames, and afterwards, stores the image difference values in the first queue. Moreover, the first queue has a maximum storage capacity, which is a maximum capacity of the image difference values that may be stored in the first queue. The maximum storage capacity is determined by the length of the first queue, and then, the first queue is also configured to remove the earliest stored image difference value in response to the quantity of the stored image difference values reaching the maximum storage capacity of the first queue, so as to continue to store the image difference values of the video frames that are subsequently captured.

In some embodiments, the maximum storage capacity of the first queue is equal to a quotient of the first predefined duration and the cycle of capturing the video frames. After the quantity of the image difference values stored in the first queue reaches the maximum storage capacity of the first queue, the earliest stored image difference values are removed one or more times over time, such that the image difference value of newly captured video frames are stored, so as to ensure that all the video frames corresponding to the image difference values stored in the first queue are video frames that are captured within a first predefined duration that lasts prior to the current time, excluding video frames captured in other time periods.

In step 102, a second sequence is acquired.

The second sequence includes: posture data of an AR device captured in a second time period.

In some embodiments, the above AR device includes an inertial measurement unit (IMU), which is a device for measuring a three-axis posture angle (or an angular velocity) and acceleration of an object. The IMU is internally provided with a three-axis gyroscope and accelerometers in three directions for measuring the angular velocity and acceleration of the object in a three-dimensional space, and determining the posture of the object based thereon. To improve reliability, it is also possible to provide each axis with more sensors in some embodiments.

In this case, the above posture data is data captured by the IMU. For example, the data captured by the IMU includes the acceleration, the angular velocity, and spatial coordinates. Although the data such as the acceleration, the angular velocity and the spatial coordinates captured by the IMU reflect the posture data of the IMU, the above data captured by the IMU is also considered as the posture data reflecting the AR device since the IMU is part of the AR device.

In some embodiments, the AR device may also store the capture time of the posture data. For example, if the capture time of the posture data is also stored in the second sequence, the second sequence then includes not only the posture data but also the capture time of the posture data. For example, the second sequence includes a plurality of captured posture data and capture times of the plurality of posture data, and the plurality of posture data are arranged in a time sequence according to the capture times.

In some embodiments, the above IMU captures video frames based on a fixed period, that is, a piece of posture data is captured every fixed period, so as to capture a plurality of consecutive posture data. Then, the duration between the capture times of any two adjacent posture data is equal.

The above second time period is: a time period prior to the current time. In some embodiments, the second time period is a time period that lasts prior to the current time by the second predefined duration, and the second predefined duration is predefined according to the application scene. For example, the above second predefined duration is 5 s, 10 s, 20 s, or the like, which is not limited in the present disclosure. In other embodiments, the second predefined duration above may not be defined, and the duration of the second time period is changeable. For example, when the second sequence is acquired under different circumstances, the duration of the second time period used is equal or unequal.

In some embodiments, the above second predefined duration is not less than the first predefined duration to guarantee that the first time period is included in the first time period.

In some embodiments, the above second sequence includes a second queue, wherein the second queue is configured to store captured posture data of the AR device. Then, the AR device captures the posture data, and afterwards, stores the posture data in the second queue. Moreover, the second queue has a maximum storage capacity, which is a maximum quantity of the posture data that may be stored in the second queue. The maximum storage capacity is determined by the length of the second queue, and then, the second queue is also configured to remove the earliest stored posture data in response to the quantity of the stored posture data reaching the maximum storage capacity of the second queue, so as to continue to store the values of the posture data that is subsequently captured.

In some embodiments, the maximum storage capacity of the second queue is equal to a quotient of the second predefined duration and a cycle of capturing the posture data. After the quantity of the posture data stored in the second queue reaches the maximum storage capacity of the second queue, the earliest stored posture data are removed one or more times over time, such that newly captured posture data are stored. Therefore, all the posture data stored in the second queue is ensured to be the posture data that is captured within a second predefined duration that lasts prior to the current time, excluding the posture data captured in other time periods.

In step 103, a posture difference value of each video frame is calculated according to the second sequence with respect to each time difference when the AR device is in a motion state, and third sequences including the calculated posture difference values are acquired, thereby acquiring a plurality of third sequences.

Each third sequence includes a corresponding time difference and includes a posture difference value of each video frame; the posture difference value of the video frame represents a difference between first posture data and second posture data; the first posture data is posture data of the AR device at a time after a capture time of the video frame is delayed by the time difference; and the second posture data is posture data of the AR device at a time after a capture time of a previous video frame of the video frame is delayed by the time difference.

In some embodiments, when the posture data includes IMU data, the above posture difference value includes a difference value between a spatial coordinate of the AR device after the capture time of the video frame is delayed by the time difference and a spatial coordinate of the AR device after the capture time of the previous video frame is delayed by the time difference.

The above plurality of time differences are a series of predefined time differences, for example:−15 ms, −5 ms, 3 ms, 11 ms, 17 ms.

In some embodiments, the above plurality of time differences are a series of difference values acquired within a time difference range according to a predefined step size. For example, if a predefined time difference range is −50 ms to 50 ms and the step is 20 ms, then the above time differences are:−50 ms, −30 ms, −10 ms, 10 ms, 30 ms, 50 ms.

Since the second predefined duration is not less than the first predefined duration, the posture data of the AR device at the capture time of each video frame is obtained in the second sequence.

In one embodiment, for a video frame, the sum of the capture time of the video frame and the time difference is calculated to obtain a time which is the time after the capture time is delayed by the time difference. With a resulting sum value, the posture data from the second sequence is obtained as the posture data corresponding to the video frame, and the posture data is the posture data captured at a time when the capture time of the video frame is delayed by the time difference. In the same way, the posture data corresponding to a previous video frame of the video frame is obtained, and the posture data is the posture data captured at the time when the capture time of the previous video frame of the video frame is delayed by the time difference. The difference value of the posture data corresponding to the video frame and the previous video frame of the video frame is calculated as the posture difference value of the video frame.

For each time difference, the posture difference value of each video frame is obtained to form a third sequence. That is, each time difference corresponds to one third sequence, and a plurality of third sequences each having a corresponding time difference may be obtained. Since each third sequence includes the posture difference value of each video frame captured in the first time period, and the first sequence includes the image difference value of each video frame captured in the first time period, the third sequence includes the same quantity of elements as the quantity of elements in the first sequence.

The above step of acquiring a plurality of third sequences is executed when the AR device is in a motion state. In some embodiments, the posture data includes acceleration and an angular velocity, and whether the above AR device is in the motion state is determined by:

acquiring a first dispersion of the accelerations in the above second sequence;

acquiring a second dispersion of the angular velocities in the above second sequence; and determining that the AR device is in a motion state when the first dispersion is greater than a first threshold and the second dispersion is greater than a second threshold, and executing the step of acquiring the plurality of third sequences.

In one embodiment, the first dispersion and the second dispersion are represented in variance, average difference, range, and the like.

In one embodiment, it is assumed that the acceleration and angular velocity included in the posture data are as shown in Table 1:

TABLE 1

| Acceleration | 8 | 11 | 9 | 7 | 3 |
|---|---|---|---|---|---|
| Angular Velocity | 17 | 24 | 19 | 18 | 21 |

If the dispersion is represented in the variance, then the above first dispersion is 49 and the second dispersion is 38. Assuming that the above first threshold is 35 and the second threshold is 30, it is determined that the above AR device is in the motion state since the first dispersion is greater than the first threshold and the second dispersion is greater than the second threshold.

In some embodiments, the state of the AR device and whether the AR device is in a static state or the motion state are also determined by a motion sensor in the AR device.

In some embodiments, the AR device may also acquire a plurality of third sequences even in the static state, or the AR device may directly acquire a plurality of third sequences without determining the state of the AR device.

In step 104, a third sequence having the maximum similarity to the first sequence is determined as a fourth sequence, and video frames and posture data for building a scene are acquired according to a time difference corresponding to the fourth sequence.

With respect to the same time, the image difference value of the video frame captured at this time may reflect the change in the posture of the AR device, and should be matched with the change in the posture data captured at this time. The first sequence includes the image difference value of each video frame, and each third sequence includes the posture difference value of each video frame after a delay of the time difference. If the first sequence is matched with the third sequence, it indicates that this time difference is close to an actual delay time difference of the capture times of the video frame and the posture data.

In one embodiment, among the plurality of acquired third sequences, a time difference corresponding to the third sequence having the maximum similarity to the first sequence may be considered to be closest to the delay time difference of the capture times of the video frame and the posture data. Therefore, the time difference corresponding to the third sequence having the maximum similarity to the first sequence is determined as a target time difference, and afterwards, the AR device acquires the video frames and posture data for building a scene according to the target time difference.

In some embodiments, the sum of the current time and the determined target time difference is acquired, the posture data of the AR device at a time corresponding to the value of the sum is acquired, and the current video frame is acquired, thereby building an AR scene with the current video frame and the acquired posture data.

The above similarity is obtained by calculating cosine similarity, an absolute value distance, a Pearson correlation coefficient and the like.

In some embodiments, the above similarity is obtained by calculating the cosine similarity. Then, the cosine similarity between the third sequence corresponding to each time difference and the first sequence is obtained; a sequence from the third sequences, having the maximum cosine similarity to the first sequence, serves as a fourth sequence; and a time difference corresponding to the fourth sequence serves as a target time difference for acquiring the posture data and the video frame.

In step 105, an AR scene is built using the acquired video frames and posture data.

The target time difference determined by the AR device may characterize a delay between the captured video frame and the posture data. For any one time, a video frame captured at this time and posture data captured at a time after this time is delayed by the target time difference should be synchronized data. Therefore, an AR scene built from this video frame and the posture data is an accurate AR scene.

In some embodiments, a video frame captured at any time is acquired; posture data at a time after this time is delayed by the target time difference is acquired; a virtual object matching the posture data is acquired; and the virtual object is added to the video frame for fusion to obtain a video frame with the virtual object added, i.e. the built AR scene. The virtual object includes game characters, beauty effects, stickers, etc.

An AR device generally may include a processor, an IMU and an image capturing unit such as a camera; and the processor controls the IMU to capture posture data, and controls the image capturing unit to capture video frames of a real-world scene. Due to a delay in the transmission of the posture data and the video frame to the processor, the posture data and the video frame received by the processor are not synchronized, leading to poor synchronization between the virtual object and the real-world scene if the time difference between the posture data and the video frame is neglected during the building of a scene.

In an embodiment of the present disclosure, considering that when the posture of the AR device changes, the posture data of the AR device captured by the IMU will also change accordingly, and meanwhile the video frames captured by the image capturing unit of the AR device will also change accordingly, both the change in the posture data and the change in the video frame may represent the change in the posture of AR device. When the video frame and posture data captured at the same time are synchronized, both of them represent the posture of the AR device at the same time; the change trends of the two in a time period reflect the change in the posture of the AR device; and the change trends of the two are matched. When the video frame and the posture data captured at the same time are not synchronized, both of them represent the postures of the AR device at different times; the change trends of the two represent the posture changes of the AR device in different time periods; and the change trends of the two are not matched. Therefore, when the change trends of the two are matched, it indicates that the captured video frames and posture data are synchronized. In this case, the time difference between the capture time of the video frame and the capture time of the posture data is the accurate time difference.

Figure 2:
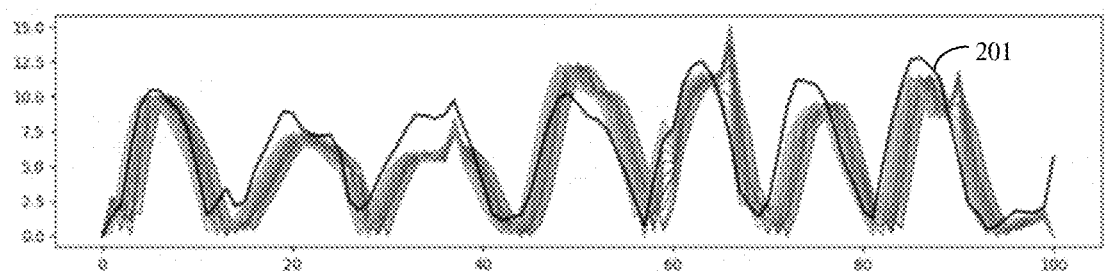
FIG. 2 is a schematic diagram showing a change trend of video frames and posture data according to an embodiment of the present disclosure.
Figure 3:
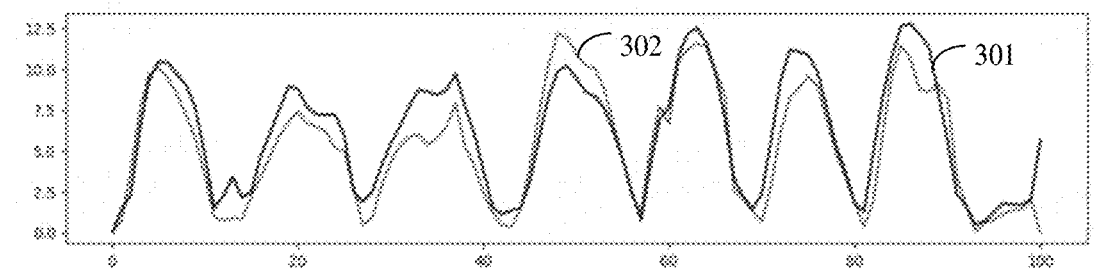
FIG. 3 is a schematic diagram showing another change trend of video frames and posture data according to an embodiment of the present disclosure.

For example, as shown in FIG. 2 and FIG. 3, FIG. 2 is a schematic diagram showing a change trend of video frames and posture data according to an embodiment of the present disclosure, with the time as the abscissa and the difference value as the ordinate. A curve 201 represents an image difference value of each video frame, and other curves represent posture difference values of the posture data at different time differences. It can be seen from FIG. 2 that the change trend of the video frames and the posture data are different at different time differences. FIG. 3 is a schematic diagram showing another change trend of video frames and posture data according to an embodiment of the present disclosure, with the time as the abscissa and the difference value as the ordinate. A curve 301 represents an image difference value of each video frame, and a curve 302 represents a posture difference value of the posture data at the target time difference. It can be seen from FIG. 3 that the change trend of the video frames and the posture data are best matched at the target time difference.

Therefore, in a solution according to an embodiment of the present disclosure, the first sequence and the second sequence are acquired. The first sequence includes an image difference value, which characterizes the posture change of the AR device and may reflect the posture change of the AR device in a time period from the perspective of the image. The second sequence includes the captured posture data of the AR device. Considering the problem that the captured posture data is not synchronized with the captured video frames, a plurality of third sequences are acquired. Each third sequence includes a posture difference value, which is the posture data of the AR device at a time after the capture time of the video frame is delayed by a time difference, and may reflect the posture change of the AR device in a time period from the perspective of posture data. Therefore, the time difference corresponding to the third sequence having the maximum matching degree with the first sequence may characterize a delay time difference between the posture data and the video frame, so as to determine the time difference corresponding to the third sequence having the maximum matching degree with the first sequence as the target time difference. In this way, the video frame and posture data for building the AR scene are acquired according to the target time difference, and the obtained posture data and video frame may be guaranteed to maintain synchronized in time. Therefore, the synchronization between the virtual object in the built AR scene and the real-world scene can be further improved.

In some embodiments, for each time difference, a posture difference value corresponding to each video frame is acquired according the following steps A to D.

In step A, a sum of a capture time of each video frame and a time difference is taken as a first time.

For example, if a capture time of a video frame is 0 ms and a predefined time difference is 10 ms, the first time is then 10 ms.

In step B, a sum of a capture time of a previous video frame of the video frame and the time difference is taken as a second time.

In step C, first posture data representing a posture of the AR device at the first time is acquired and second posture data representing a posture of the AR device at a second time are acquired according to the second sequence.

The first posture data represents the posture of the AR device at the first time, i.e., the posture of the AR device after the capture time of the video frame is delayed by a time difference; and the second posture data represents the posture of the AR device at the second time, i.e., the posture of the AR device after the capture time of the previous video frame of this video frame is delayed by the time difference.

In some embodiments, that the first posture data representing the posture of the AR device at the first time is acquired according to the second sequence includes: from the second sequence above, a predefined quantity of posture data with a minimum time difference between the capture time of the posture data and the first time is searched for; and the first posture data representing the posture of the above AR device at the first time is acquired according to the searched posture data.

The above predefined number is predefined according to an application scene, for example, 5, 10, 20, etc., which is not limited in the present disclosure.

In another embodiment of the present disclosure, that the first posture data representing the posture of the AR device at the first time is acquired according to the second sequence includes: from the second sequence above, posture data with a time difference between the capture time of the posture data and the first time within a present range is searched for; and the first posture data representing the posture of the above AR device at the first time is acquired according to the searched posture data.

The second posture data is acquired in the same way as the way in which the first posture data is acquired, which is not repeated herein.

In step D, a posture difference value of the video frame is acquired according to the first posture data and the second posture data.

For each video frame, there are corresponding first posture data and second posture data. For one video frame, the first time is obtained according to the capture time of the above video frame; then the first posture data is obtained according to the first time; the second time is obtained according to the capture time of the previous video frame of the above video frame; then the second posture data is obtained according to the second time; and a posture difference value of the above video frame is acquired from the above first and second posture data.

In some embodiments, a predefined quantity of posture data with a minimum time difference between the capture time of the posture data and the first time are searched for to obtain an average value of the above posture data as the first posture data; or the above posture data is linearly fitted to acquire the first posture data.

It is assumed that the capture time of the first posture data is taken as a reference, that is, the capture time of the first posture data is considered to be 0 ms, and the capture times of the respective subsequent posture data are recorded with respect to the above reference, as shown in Table 2 below. In addition, Table 2 also shows the posture data captured at each capture time.

TABLE 2

| Capture Time of Posture Data | 0 ms | $3^{rd}$ ms | $6^{th}$ ms | $9^{th}$ ms | $12^{th}$ ms | $15^{th}$ ms | $18^{th}$ ms | $21^{st}$ ms | $24^{th}$ ms |
|---|---|---|---|---|---|---|---|---|---|
| Posture Data | 10 | 12 | 14 | 15 | 19 | 13 | 8 | 16 | 21 |

Assuming that the first time is the $12^{th}$ ms and the predefined number is 5, five pieces of posture data with a minimum time difference from the first time are as follows: 14, 15, 19, 13, and 8. By taking an average value of these posture data as the first posture data, the first posture data is:

$$\frac{14+15+19+13+8}{5} = 13.8.$$

In some embodiments, when the first time is the capture time of the posture data in the second sequence, the posture data captured at the first time is directly acquired from the second sequence; and when the first time is not the capture time of any posture data in the second sequence, the first posture data is acquired by linear interpolation.

Assuming that the second time is the $10^{th}$ ms, two pieces of posture data 15 and 19 with a minimum time difference between the capture time and the second time are searched, and then calculated by linear interpolation:

$$\frac{(16-9)*(19-15)}{12-9} + 15 = 16.3.$$

Wherein, the second posture data is 16.3.

With the first posture data being 13.8 and the second posture data being 16.3, then 13.8−16.3=−2.3, and a posture difference value of the video frame is −2.5.

Figure 4:
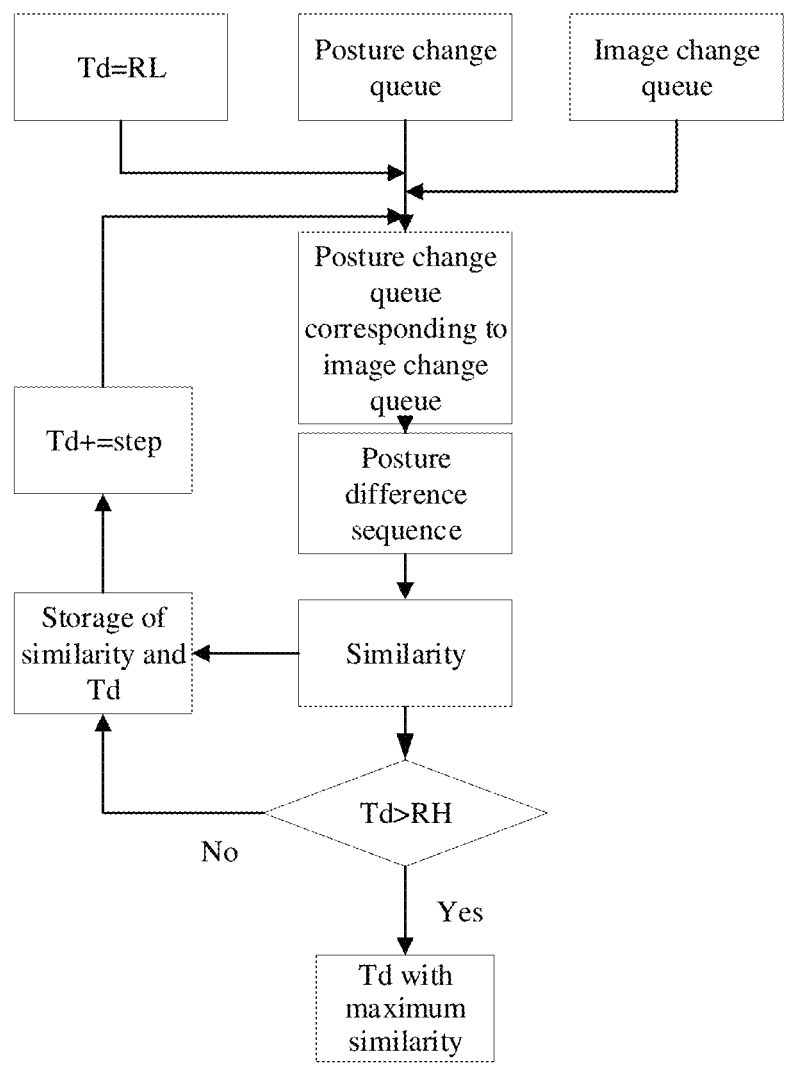
FIG. 4 is a schematic diagram showing a scene building process according to an embodiment of the present disclosure.

FIG. 4 is a schematic diagram showing a scene building process according to an embodiment of the present disclosure. Referring to FIG. 4, the process includes the following steps.

In step 401, the image difference values of the captured video frames are stored in an image change queue.

In step 402, the captured posture data is stored in a posture change queue.

In step 403, time difference range (RL, RH) is set; a step is defined; Td is defined to an iterative time difference, with an initial value of RL; and Td is iterated by the step within the time difference range. RL is less than RH, and a difference between RH and RL is greater than step.

In step 404, posture data at a time when the capture time of the video frame is delayed by Td is acquired according to the current Td to form the posture change queue corresponding to the image change queue.

In step 405, a posture difference sequence corresponding to the current Td is acquired according to the posture data in the above posture change queue, and includes a posture difference value of each video frame.

In step 406, the similarity between the posture difference sequence and the image change sequence is acquired, and this similarity is stored in correspondence to the current Td.

In step 407, when Td is not greater than RH, the Td is increased by a step to obtain an updated Td, and steps 404-406 are performed continuously.

In step 408, when Td is greater than RH, the Td with the maximum similarity is selected from the plurality of stored similarities as a target time difference.

In step 409, the video frames and the posture data are acquired according to the target time difference, and then an AR scene is built using the acquired video frames and posture data.

Figure 5:
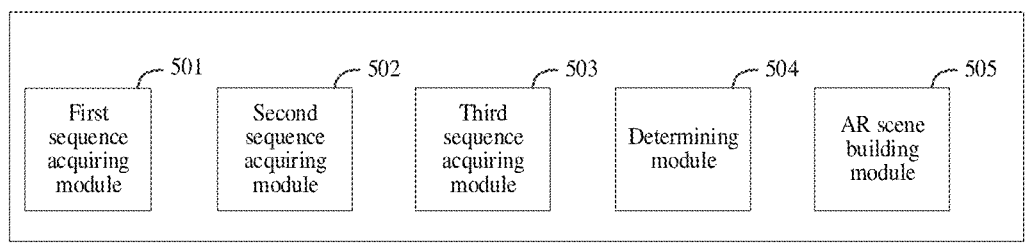
FIG. 5 is a block diagram showing an apparatus for building a scene according to an embodiment of the present disclosure.

FIG. 5 is a block diagram showing an apparatus for building a scene according to an embodiment of the present disclosure. The apparatus is applicable to the AR device. Referring to FIG. 5, the apparatus includes: a first sequence acquiring module 501, a second sequence acquiring module 502, a third sequence acquiring module 503, a determining module 504 and an AR scene building module 505.

The first sequence acquiring module 501 is configured to acquire a first sequence, wherein the first sequence includes image difference values of video frames captured in a first time period;

The second sequence acquiring module 502 is configured to acquire a second sequence, wherein the second sequence includes posture data of the AR device captured in a second time period, wherein the first time period and the second time period include time periods prior to a current time, and a duration of the second time period is not less than a duration of the first time period;

The third sequence acquiring module 503 is configured to acquire plurality of third sequences, wherein each third sequence includes a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

The determining module 504 is configured to determine a target time difference, and acquire the video frames and posture data for building a scene according to the above target time difference, wherein the target time difference includes a time difference corresponding to the third sequence with a maximum similarity to the first sequence; and The AR scene building module 505 is configured to build an AR scene using the acquired video frames and posture data.

In some embodiments, the above third sequence acquiring module 503 is configured to acquire a posture difference value of each video frame for each time difference.

The third sequence acquiring module 503 includes: a first time acquiring unit, a second time acquiring unit, a posture data acquiring unit and a posture difference acquiring unit.

The first time acquiring unit is configured to take a sum of the capture time of the video frame and the time difference as a first time;

The second time acquiring unit is configured to take a sum of the capture time of a previous video frame of the video frame and the time difference as a second time;

The posture data acquiring unit is configured to acquire first posture data and second posture data according to the second sequence, wherein the first posture data represents a posture of the AR device at the first time, and the second posture data represents a posture of the AR device at the second time; and The posture difference acquiring unit is configured to acquire a posture difference value of the video frame according to the first posture data and the second posture data.

In some embodiments, the above posture data acquiring unit is configured to:

search for a predefined quantity of posture data with a minimum time difference between the capture time of the posture data and the first time; and acquire the first posture data according to the searched posture data.

In some embodiments, the image difference value of each video frame includes an average modulus length of an optical flow between the video frame and a previous video frame of the video frame.

In some embodiments, the posture data includes acceleration and angular velocity, and the apparatus further includes a motion state judging module. The motion state judging module is configured to acquire a first dispersion of the acceleration in the second sequence, acquire a second dispersion of the angular velocity in the second sequence, and determine that the AR device is in a motion state when the first dispersion is greater than a first threshold and the second dispersion is greater than a second threshold.

In some embodiments, the first sequence includes a first queue, wherein the first queue is configured to store the image difference values of the captured video frames, and remove an earliest stored image difference value in response to a quantity of the stored image difference values reaching a maximum storage capacity of the first queue.

In some embodiments, the second sequence includes a second queue, wherein the second queue is configured to store the captured posture data of the AR device, and remove earliest stored posture data in response to a quantity of the stored posture data reaching a maximum storage capacity of the second queue.

In some embodiments, the plurality of time differences are acquired within a time difference range according to a predefined step.

With respect to the apparatus in the embodiments above, the manner of respective modules to execute the operation has been described in detail in the embodiments related to this method, and a detailed description thereof will not be repeated here.

In a solution according to an embodiment of the present disclosure, a first sequence and a second sequence are acquired. The first sequence includes an image difference value, which characterizes the posture change of the AR device and may reflect the posture change of the AR device in a time period from the perspective of the image. The second sequence includes the captured posture data of the AR device. Considering the problem that the captured posture data is not synchronized with the captured video frames, a plurality of third sequences are acquired. Each third sequence includes a posture difference value, which is the posture data of the AR device at a time after the capture time of the video frame is delayed by a time difference, and may reflect the posture change of the AR device in a time period from the perspective of posture data. Therefore, the time difference corresponding to the third sequence having the maximum matching degree with the first sequence may characterize a delay time difference between the posture data and the video frame, so as to determine the time difference corresponding to the third sequence having the maximum matching degree with the first sequence as the target time difference. In this way, the video frame and posture data for building the AR scene are acquired according to the target time difference, and the obtained posture data and video frame may be guaranteed to maintain synchronized in time. Therefore, the synchronization between the virtual object in the built AR scene and the real-world scene can be further improved.

Figure 6:
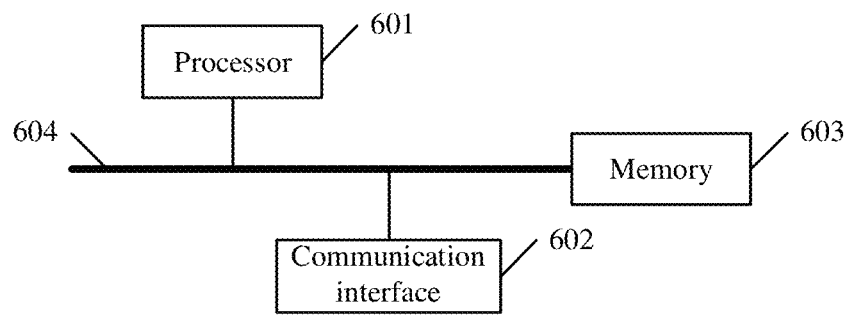
FIG. 6 is a block diagram showing an electronic device according to an embodiment of the present disclosure.

FIG. 6 is a block diagram showing an electronic device according to an embodiment of the present disclosure, and the electronic device is applicable to the AR device. Referring to FIG. 6, the electronic device includes a processor 601, a communication interface 602, a memory 603, and a communication bus 604, wherein the processor 601, the communication interface 602, and the memory 603 complete communication with one another by the communication bus 604.

The memory 603 is configured to store instructions executable by the processor 601.

The processor 601 is configured to execute the instructions stored in the memory 603 to perform the following steps:

acquiring a first sequence, wherein the first sequence includes image difference values of video frames captured in a first time period;

acquiring a second sequence, wherein the second sequence includes posture data of the AR device captured in a second time period, wherein the first time period and the second time period include time periods prior to a current time, and a duration of the second time period is not less than a duration of the first time period;

acquiring a plurality of third sequences, wherein each third sequence includes a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

determining a target time difference, wherein the target time difference includes a time difference corresponding to the third sequence with a maximum similarity to the first sequence; and acquiring video frames and posture data for building a scene according to the target time difference, and building an AR scene using the acquired video frames and posture data.

In some embodiments, the processor 601 is configured to execute the above instructions to perform the following steps:

acquiring a posture difference value of each video frame with respect to each time difference by:

taking a sum of the capture time of the video frame and the time difference as a first time;

taking a sum of the capture time of a previous video frame of the video frame and the time difference as a second time;

acquiring first posture data and second posture data according to the second sequence, wherein the first posture data represents a posture of the AR device at the first time, and the second posture data represents a posture of the AR device at the second time; and acquiring a posture difference value of the video frame according to the first posture data and the second posture data.

In some embodiments, the processor 601 is configured to execute the above instructions to perform the following steps:

searching for a predefined quantity of posture data with a minimum time difference between the capture time of the posture data and the first time; and acquiring the first posture data according to the searched posture data.

In some embodiments, the image difference value of each video frame includes an average modulus length of an optical flow between the video frame and a previous video frame of the video frame.

In some embodiments, the above posture data includes acceleration and an angular velocity; and the above processor 601 is further configured to execute the above instructions to perform the following steps:

acquiring a first dispersion of the accelerations in the above second sequence;

acquiring a second dispersion of the angular velocities in the above second sequence; and determining that the AR device is in a motion state when the first dispersion is greater than a first threshold and the second dispersion is greater than a second threshold, and executing the step of acquiring the plurality of third sequences.

In some embodiments, the first sequence includes a first queue, wherein the first queue is configured to store the image difference values of the captured video frames, and remove an earliest stored image difference value in response to a quantity of the stored image difference values reaching a maximum storage capacity of the first queue.

In some embodiments, the second sequence includes a second queue, wherein the second queue is configured to store the captured posture data of the AR device, and remove earliest stored posture data in response to a quantity of the stored posture data reaching a maximum storage capacity of the second queue.

In some embodiments, the plurality of time differences are acquired within a time difference range according to a predefined step.

The communication bus mentioned in the above electronic device is a peripheral component interconnect (PCI) bus or an extended industry standard architecture (EISA) bus and the like. The communication bus is divided into an address bus, a data bus, a control bus and the like. For ease of representation, only a bold line is used in the drawing for representation, but is not intended to mean that only one bus or one type of bus is present.

The communication interface is configured for communication between the above electronic device and other devices.

The memory includes a random-access memory (RAM), and also includes a non-volatile memory (NVM), for example, at least one disk memory. In some embodiments, the memory is also at least one storage apparatus located away from the aforementioned processor.

The above processor is a general-purpose processor, including a central processing unit (CPU), a network processor (NP), or the like, and the above processor is also a digital signal processor (DSP), an application specific integrated circuit (ASIC), a field programmable gate array (FPGA) or other programmable logic devices, a discrete gate or transistor logic device, or a discrete hardware component.

In a further embodiment according to the present disclosure, there is provided a computer-readable storage medium, which stores instructions. When the instructions in the storage medium are executed by a processor of an electronic device, the electronic device may be enabled to perform the following steps:

acquiring a first sequence, wherein the first sequence includes image difference values of video frames captured in a first time period;

acquiring a second sequence, wherein the second sequence includes posture data of the AR device captured in a second time period, wherein the first time period and the second time period include time periods prior to a current time, and a duration of the second time period is not less than a duration of the first time period;

acquiring a plurality of third sequences, wherein each third sequence has a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

determining a target time difference, wherein the target time difference includes a time difference corresponding to the third sequence with a maximum similarity to the first sequence; and acquiring video frames and posture data for building a scene according to the target time difference, and building an AR scene using the acquired video frames and posture data.

In some embodiments, when the instructions in the above storage medium are executed by the processor of the electronic device, the electronic device may be enabled to perform the following step:

acquiring a posture difference value of each video frame with respect to each time difference by:

taking a sum of the capture time of the video frame and the time difference as a first time; and taking a sum of the capture time of a previous video frame of the video frame and the time difference as a second time;

acquiring first posture data and second posture data according to the second sequence, wherein the first posture data represents a posture of the AR device at the first time, and the second posture data represents a posture of the AR device at the second time; and acquiring a posture difference value of the video frame according to the first posture data and the second posture data.

In some embodiments, when the instructions in the above storage medium are executed by the processor of the electronic device, the electronic device may be enabled to perform the following steps:

searching for a predefined quantity of posture data with a minimum time difference between the capture time of the posture data and the first time; and acquiring the first posture data according to the searched posture data.

In some embodiments, the image difference value of each video frame is an average modulus length of an optical flow between the video frame and a previous video frame of the video frame.

In some embodiments, the above posture data includes acceleration and an angular velocity; and the above processor 601 is further configured to execute the above instructions to perform the following steps:

acquiring a first dispersion of the accelerations in the above second sequence;

acquiring a second dispersion of the angular velocity in the above second sequence; and determining that the AR device is in a motion state when the first dispersion is greater than a first threshold and the second dispersion is greater than a second threshold, and executing the step of acquiring the plurality of third sequences.

In some embodiments, the first sequence includes a first queue, wherein the first queue is configured to store the image difference values of the captured video frames, and remove an earliest stored image difference value in response to a quantity of the stored image difference values reaching a maximum storage capacity of the first queue.

In some embodiments, the second sequence includes a second queue, wherein the second queue is configured to store the captured posture data of the AR device, and remove earliest stored posture data in response to a quantity of the stored posture data reaching a maximum storage capacity of the second queue.

In some embodiments, the plurality of time differences are acquired within a time difference range according to a predefined step.

In yet another embodiment according to the present disclosure, there is provided a computer program product containing instructions. When the computer program product runs on a computer, the computer is enabled to execute the following steps:

acquiring a first sequence, wherein the first sequence includes image difference values of video frames captured in a first time period;

acquiring a second sequence, wherein the second sequence includes posture data of the AR device captured in a second time period, the first time period and the second time period are time periods prior to a current time, and a duration of the second time period is not less than a duration of the first time period;

acquiring a plurality of third sequences, wherein each third sequence includes a corresponding time difference and includes a posture difference value of each video frame, the posture difference value of the video frame representing a difference between first posture data and second posture data, wherein the first posture data includes posture data of the AR device at a time after a capture time of the video frame is delayed by the time difference, and the second posture data includes posture data of the AR device at a time after a capture time of a previous video frame of the video frame is delayed by the time difference;

determining a target time difference, wherein the target time difference includes a time difference corresponding to the third sequence with a maximum similarity to the first sequence; and acquiring video frames and posture data for building a scene according to the target time difference, and building an AR scene using the acquired video frames and posture data.

In some embodiments, when the computer program product runs on the computer, the computer is enabled to execute the following steps:

acquiring a posture difference value of each video frame with respect to each time difference by:

taking a sum of the capture time of the video frame and the time difference as a first time; and taking a sum of the capture time of a previous video frame of the video frame and the time difference as a second time;

acquiring first posture data and second posture data according to the second sequence, wherein the first posture data represents a posture of the AR device at the first time, and the second posture data represents a posture of the AR device at the second time; and acquiring a posture difference value of the video frame according to the first posture data and the second posture data.

In some embodiments, when the computer program product runs on the computer, the computer is enabled to perform the following steps:

searching for a predefined quantity of posture data with a minimum time difference between the capture time of the posture data and the first time; and acquiring the first posture data according to the searched posture data.

In some embodiments, the image difference value of each video frame includes an average modulus length of an optical flow between the video frame and a previous video frame of the video frame.

In some embodiments, the above posture data includes acceleration and an angular velocity; and the above processor 601 is further configured to execute the above instructions to perform the following steps:

acquiring a first dispersion of the accelerations in the above second sequence;

acquiring a second dispersion of the angular velocities in the above second sequence; and determining that the AR device is in a motion state when the first dispersion is greater than a first threshold and the second dispersion is greater than a second threshold, and executing the step of acquiring the plurality of third sequences.

In some embodiments, the first sequence includes a first queue, wherein the first queue is configured to store the image difference values of the captured video frames, and remove an earliest stored image difference value in response to a quantity of the stored image difference values reaching a maximum storage capacity of the first queue.

In some embodiments, the second sequence includes a second queue, wherein the second queue is configured to store the captured posture data of the AR device, and remove earliest stored posture data in response to a quantity of the stored posture data reaching a maximum storage capacity of the second queue.

In some embodiments, the plurality of time differences are acquired within a time difference range according to a predefined step.

It can be seen that in the solutions according to the embodiments of the present disclosure, a first sequence and a second sequence are acquired. The first sequence includes an image difference value, which characterizes the posture change of the AR device and may reflect the posture change of the AR device in a time period from the perspective of the image. The second sequence includes the captured posture data of the AR device. Considering the problem that the captured posture data is not synchronized with the captured video frames, a plurality of third sequences are acquired. Each third sequence includes a posture difference value, which includes the posture data of the AR device at a time after the capture time of the video frame is delayed by a time difference, and may reflect the posture change of the AR device in a time period from the perspective of posture data. Therefore, the time difference corresponding to the third sequence having the maximum matching degree with the first sequence may characterize a delay time difference between the posture data and the video frame, so as to determine the time difference corresponding to the third sequence having the maximum matching degree with the first sequence as the target time difference. In this way, the video frame and posture data for building the AR scene are acquired according to the target time difference, and the obtained posture data and video frame may be guaranteed to maintain synchronized in time. Therefore, the synchronization between the virtual object in the built AR scene and the real-world scene can be further improved.

The electronic device, the computer-readable storage medium, and the computer program product according to the embodiments of the present disclosure can quickly and accurately implement the method for building the scene according to the embodiments of the present disclosure. Compared with related technologies, the solutions according to the embodiments of the present disclosure are applied to improve the synchronization between the virtual objects and the real-world scene in the built AR scene.

In some embodiments, all or part of the above embodiments are implemented by software, hardware, firmware, or any combination thereof. When implemented by the software, all or part of above embodiments are implemented in the form of a computer program product. The computer program product includes one or more computer instructions. When the computer program instructions are loaded and executed on the computer, all or part of the processes or functions according to the embodiments of the present disclosure are generated. In some embodiments, the computer is a general computer, a special computer, a computer network, or other programmable devices. In some embodiments, the computer instructions are stored in a computer-readable storage medium or transferred from one computer-readable storage medium to another computer-readable storage medium. For example, the computer instructions can be transferred from a website site, computer, server or data center to another website site, computer, server or data center through a wired (such as an coaxial cable, an optical fiber and a digital subscriber line (DSL)) or a wireless (such as infrared, wireless and microwave) manner. In some embodiments, the computer-readable storage medium includes any available medium that can be accessed by the computer or a data storage device such as a server or a data center including and integrated by one or more available mediums. In some embodiments, the available medium includes a magnetic medium (such as a floppy disk, a hard disk and a magnetic tape), an optical medium (for example, DVD), a semiconductor medium (for example, a solid-state disk (SSD)), or the like.

It should be noted that, as used herein, relation terms such as "first" and "second" are used merely to distinguish a subject or an operation from another subject or another operation, and not to imply any substantial relation or order between these subjects or operations. Moreover, the terms "include", "contain" or any variation thereof are intended to cover an nonexclusive containing meaning, such that a process, a method, an item or a device containing a series of elements not only includes these elements, but also includes other elements that are not defined forth specifically, or also includes an inherent element of such a process, method, item or device. Without more limitations, the element defined by the phrase "including a . . . " does not exclude the presence of additional equivalent elements in the process, method, item, or device that includes the element.

The various embodiments in the specification are described in a progressive manner, the same or similar parts between the various embodiments may be referred to each other, and each embodiment focuses on the differences from the other embodiments. In particular, for the apparatus embodiment, since it is basically similar to the method embodiment, the description is relatively simple, and the relevant parts may be referred to the description of the method embodiment.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for building a scene, applicable to an augmented reality (AR) device, the method comprising:
    acquiring a first sequence, wherein the first sequence comprises image difference values of video frames captured in a first time period;
    acquiring a second sequence, wherein the second sequence comprises posture data of the AR device captured in a second time period, wherein the first time period and the second time period are time periods prior to a current time, and a duration of the second time period is not less than a duration of the first time period;
    acquiring a plurality of third sequences, wherein each third sequence comprises a corresponding time difference and comprises a posture difference value of each video frame, the posture difference value of the video frame representing a difference between first posture data and second posture data, wherein the first posture data comprises posture data of the AR device at a time after a capture time of the video frame is delayed by the time difference, and the second posture data comprises posture data of the AR device at a time after a capture time of a previous video frame of the video frame is delayed by the time difference;
    determining a target time difference, wherein the target time difference comprises a time difference corresponding to the third sequence with a maximum similarity to the first sequence; and
    acquiring video frames and posture data for building a scene according to the target time difference, and building an AR scene using the acquired video frames and posture data.

2. The method according to claim 1, wherein acquiring the plurality of third sequences comprises:
    acquiring a posture difference value of each video frame with respect to each time difference by:
        taking a sum of the capture time of the video frame and the time difference as a first time;

taking a sum of the capture time of a previous video frame of the video frame and the time difference as a second time;

acquiring first posture data and second posture data according to the second sequence, wherein the first posture data represents a posture of the AR device at the first time, and the second posture data represents a posture of the AR device at the second time; and acquiring a posture difference value of the video frame according to the first posture data and the second posture data.

3. The method according to claim 2, wherein acquiring the first posture data according to the second sequence comprises:

searching for a predefined quantity of posture data with a minimum time difference between the capture time of the posture data and the first time; and acquiring the first posture data according to the searched posture data.

4. The method according to claim 1, wherein the image difference value of each video frame comprises an average modulus length of an optical flow between the video frame and a previous video frame of the video frame.

5. The method according to claim 1, wherein the posture data comprises accelerations and angular velocities, and the method further comprises:

acquiring a first dispersion of the accelerations in the second sequence;

acquiring a second dispersion of the angular velocities in the second sequence; and determining that the AR device is in a motion state when the first dispersion is greater than a first threshold and the second dispersion is greater than a second threshold, and performing the step of acquiring the plurality of third sequences.

6. The method according to claim 1, wherein the first sequence includes a first queue, wherein the first queue is configured to store the image difference values of the captured video frames, and remove an earliest stored image difference value in response to a quantity of the stored image difference values reaching a maximum storage capacity of the first queue.

7. The method according to claim 1, wherein the second sequence includes a second queue, wherein the second queue is configured to store the captured posture data of the AR device, and remove earliest stored posture data in response to a quantity of the stored posture data reaching a maximum storage quantity of the second queue.

8. The method according to claim 1, wherein the plurality of time differences are acquired within a time difference range according to a predefined step.

9. An electronic device, comprising:

a processor;

a memory, configured to store instructions executable by the processor, wherein the processor is configured to execute the instructions to perform the following steps:

acquiring a first sequence, wherein the first sequence comprises image difference values of video frames captured in a first time period;

acquiring a second sequence, wherein the second sequence comprises posture data of an augmented reality (AR) device captured in a second time period, wherein the first time period and the second time period are time periods prior to a current time, and a duration of the second time period is not less than a duration of the first time period;

acquiring a plurality of third sequences, wherein each third sequence comprises a corresponding time difference and comprises a posture difference value of each video frame, the posture difference value of the video frame representing a difference between first posture data and second posture data, wherein the first posture data comprises posture data of the AR device at a time after a capture time of the video frame is delayed by the time difference, and the second posture data comprises posture data of the AR device at a time after a capture time of a previous video frame of the video frame is delayed by the time difference;

determining a target time difference, wherein the target time difference comprises a time difference corresponding to the third sequence with a maximum similarity to the first sequence; and acquiring video frames and posture data for building a scene according to the target time difference, and building an AR scene using the acquired video frames and posture data.

10. The electronic device according to claim 9, wherein the processor is configured to execute the instructions to perform the following step:

acquiring a posture difference value of each video frame with respect to each time difference by:

taking a sum of the capture time of the video frame and the time difference as a first time;

taking a sum of the capture time of a previous video frame of the video frame and the time difference as a second time;

acquiring first posture data and second posture data according to the second sequence, wherein the first posture data represents a posture of the AR device at the first time, and the second posture data represents a posture of the AR device at the second time; and acquiring a posture difference value of the video frame according to the first posture data and the second posture data.

11. The electronic device according to claim 9, wherein the processor is configured to execute the instructions to perform the following steps:

searching for a predefined quantity of posture data with a minimum time difference between the capture time of the posture data and the first time; and acquiring the first posture data according to the searched posture data.

12. The electronic device according to claim 9, wherein the image difference value of each video frame comprises an average modulus length of an optical flow between the video frame and a previous video frame of the video frame.

13. The electronic device according to claim 9, wherein the posture data comprise accelerations and angular velocities; and the processor is further configured to execute the instructions to perform the following steps:

acquiring a first dispersion of the accelerations in the second sequence;

acquiring a second dispersion of the angular velocities in the second sequence; and determining that the AR device is in a motion state when the first dispersion is greater than a first threshold and the second dispersion is greater than a second threshold, and performing the step of acquiring the plurality of third sequences.

14. The electronic device according to claim 9, wherein the first sequence includes a first queue, wherein the first queue is configured to store the image difference values of the captured video frames, and remove an earliest stored image difference value in response to a quantity of the stored image difference values reaching a maximum storage capacity of the first queue.

15. The electronic device according to claim 9, wherein the second sequence includes a second queue, wherein the second queue is configured to store the captured posture data of the AR device, and remove earliest stored posture data in response to a quantity of the stored posture data reaching a maximum storage capacity of the second queue.

16. The electronic device according to claim 9, wherein the plurality of time differences are acquired within a time difference range according to a predefined step.

17. A non-transitory storage medium storing instructions therein, wherein when the instructions stored in the storage medium are executed by a processor of an electronic device, the electronic device performs the following steps:

acquiring a first sequence, wherein the first sequence comprises image difference values of video frames captured in a first time period;

acquiring a second sequence, wherein the second sequence comprises posture data of an augmented reality (AR) device captured in a second time period, wherein the first time period and the second time period comprise time periods prior to a current time, and a duration of the second time period is not less than a duration of the first time period;

acquiring a plurality of third sequences, wherein each third sequence comprises a corresponding time difference and comprises a posture difference value of each video frame, the posture difference value of the video frame representing a difference between first posture data and second posture data, wherein the first posture data comprises posture data of the AR device at a time after a capture time of the video frame is delayed by the time difference, and the second posture data comprises posture data of the AR device at a time after a capture time of a previous video frame of the video frame is delayed by the time difference;

determining a target time difference, wherein the target time difference comprises a time difference corresponding to the third sequence with a maximum similarity to the first sequence; and acquiring video frames and posture data for building a scene according to the target time difference, and building an AR scene using the acquired video frames and posture data.

* * * * *